United States Patent

Rahim et al.

[11] Patent Number: 5,806,022
[45] Date of Patent: Sep. 8, 1998

[54] METHOD AND SYSTEM FOR PERFORMING SPEECH RECOGNITION

[75] Inventors: Mazin G. Rahim, Manalapan; Jay Gordon Wilpon, Warren, both of N.J.

[73] Assignee: AT&T Corp., Middletown, N.J.

[21] Appl. No.: 575,378

[22] Filed: Dec. 20, 1995

[51] Int. Cl.[6] ............................... G10L 3/02; G10L 9/00; H04M 1/76
[52] U.S. Cl. ................ 704/205; 704/226; 374/410
[58] Field of Search ................ 395/2.46, 2.35, 395/2.4, 2.55, 2.6, 2.14; 379/410

[56] References Cited

U.S. PATENT DOCUMENTS 5,195,132  3/1993  Bowler et al. ........................ 379/410

OTHER PUBLICATIONS

Jankowski et al., "A Comparison Of Signal Processing Front Ends For Automatic Word Recognition", IEEE Transactions on Speech and Audio Precessing, vol. 3, No. 4, Jul. 1995. pp. 286–293.

Rabiner et al., "Fundamentals of Speech Recognition" Prentice–Hall, Englewood Cills, NJ, 1993, pp. 103–107, 112–117 and 183–190.

*Primary Examiner*—David R. Hudspeth
*Assistant Examiner*—Patrick N. Edouard

[57] ABSTRACT

Speech recognition processing is compensated for improving robustness of speech recognition in the presence of enhanced speech signals. The compensation overcomes the adverse effects that speech signal enhancement may have on speech recognition performance, where speech signal enhancement causes acoustical mismatches between recognition models trained using unenhanced speech signals and feature data extracted from enhanced speech signals. Compensation is provided at the front end of an automatic speech recognition system by combining linear predictive coding and mel-based cepstral parameter analysis for computing cepstral features of transmitted speech signals used for speech recognition processing by selectively weighting mel-filter banks when processing frequency domain representations of the enhanced speech signals.

46 Claims, 3 Drawing Sheets

METHOD AND SYSTEM FOR PERFORMING SPEECH RECOGNITION

FIELD OF THE INVENTION

This invention relates to speech recognition processing, and more particularly, relates to the performance of speech recognition for minimizing sensitivity when speech signals have been enhanced.

BACKGROUND OF THE INVENTION

Speech signals which are transmitted through a telecommunication network, such as a long distance exchange network, often may be affected acoustically by unknown variable conditions. These conditions may significantly deteriorate the performance of an automatic speech recognition (ASR) system that is typically included in such a network. Such conditions may include, for example, ambient noise, channel interference and the utilization of different sound detection equipment.

A typical ASR system performs speech recognition by comparing or matching feature data representative of transmitted speech signals to data patterns representative of phonetic units, known as training recognition models. The recognition models are typically obtained by monitoring the transmission of predetermined speech signals having known phonetic characteristics through the same network connection path that actual speech signals, such as those occurring during a telephone conversation, will be transmitted to an ASR system.

In many instances, the presence of unknown variable conditions in a network path may cause acoustical mismatches between the recognition models and the testing data. These acoustical mismatches may cause deterioration in speech recognition performance. Acoustical mismatches are likely to occur, for example, when speech signals transmitted through a network path are enhanced for improving speech quality to human perception. When such enhancement occurs, speech recognition performance may become suboptimal where the recognition models used in speech recognition processing have not been generated or trained on a network connection path which includes similar speech signal enhancement circuitry. Current speech signal processing techniques that attempt to provide an ASR system robustness in matching features representative of detected speech signals with recognition models typically do not sufficiently compensate for acoustical mismatches which may result as discussed above.

SUMMARY OF THE INVENTION

The present invention is directed to a method and system for improved speech recognition performance. Information is utilized for implementing compensation that provides superior robustness to speech recognition performance in networks with enhancement, where, for example, the recognition models have not been generated or trained on a network connection path with similar enhancement circuitry. The utilized information pertains to the spectral effects of enhancement on the speech signals during transmission over a network connection path.

In one aspect of the present invention, speech signal enhancement is compensated during the performance of feature extraction processing at the front end of a speech recognition system which includes a feature extractor and a speech recognizer. The feature extractor computes cepstral features of the enhanced speech signals using a combination of linear predictive coding (LPC) and mel-filter analysis. The extractor compensates for the enhancement to the time varying speech signals after they are transformed to a frequency domain representation.

One aspect of the inventive method provides that, first, the time varying enhanced speech signals are sampled. These samples are collected into frames, and then converted from time to frequency domain representations using Fourier transformation. Then, the power spectrum for each frame is subjected to selectively weighted mel-filter bank processing, where the weightings selectively compensate for the effect of the enhancement on the spectral characteristics of the speech signals. Subsequently, cepstral features are obtained by computing autocorrelation coefficients from spectral representations of the compensated, enhanced speech signals, and then by performing LPC analysis and cepstral recursion.

Additional features and advantages of the present invention will become readily apparent to those of ordinary skill in the art by reference to the following detailed description and accompanying drawings.

DETAILED DESCRIPTION

Figure 1:
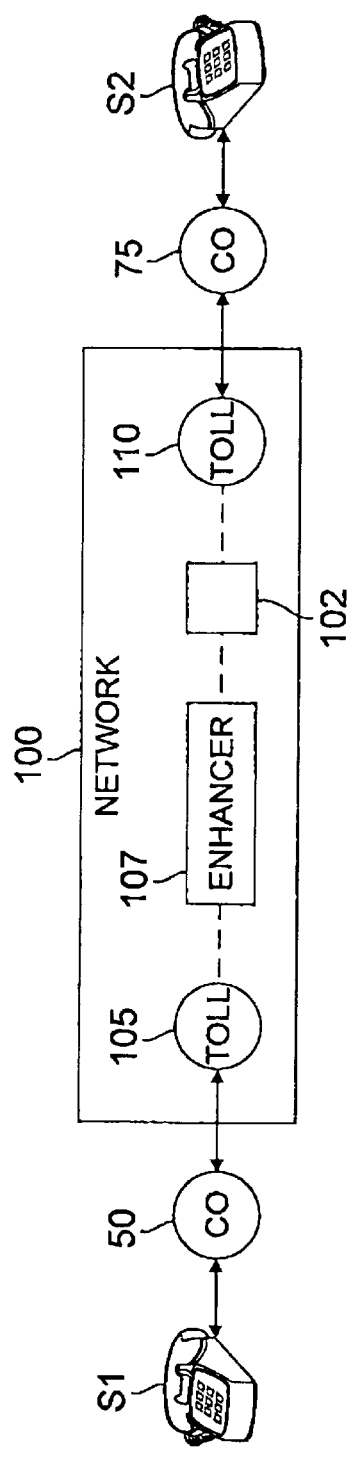
FIG. 1 illustrates a block diagram of an improved telecommunication network suitable for performing speech recognition processing on enhanced speech signals in accordance with the present invention.

FIG. 1 shows a block diagram of an exemplary telecommunication network 100 suitable for performing speech recognition processing on enhanced speech signals in accordance with the present inventive technique.

Referring to FIG. 1, the network 100 may suitably comprise a plurality of toll offices, such as toll offices 105 and 110, which may be interconnected, in any of a variety of well known fashions, to one another to provide long distance voice and data connections for its subscribers, such as telephone users, associated with station sets S1 and S2. A local central office 50 connects the station S1 to the toll office 105, and a local central office 75 connects the station S2 to the toll office 110.

The network 100 may suitably further include a speech enhancement device or enhancer 107 in the connection path between the toll offices 105 and 110 for enhancing the quality of speech signals before they are received by a subscriber, such as a telephone user. For example, the enhancer 107 may include suitable circuitry, such as echo cancelling circuitry, or other circuitry, for increasing or decreasing the power level of speech signals. See U.S. Pat. No. 5,195,132, incorporated by reference herein, for a more detailed description of the implementation of speech signal enhancement in a network which involves increasing the power levels of select frequencies.

In accordance with the present invention, a speech signal processor 102 is additionally included in the network connection path to receive speech signals from the enhancer 107 and provide for speech signal recognition signal processing including feature extraction, as more fully discussed below. A telephone connection from the station S1 to the station S2 is suitably established through the local central office 50, the toll office 105, the enhancer 107, the processor 102, the toll office 110 and the local central office 75 according to conventional techniques which will not be described herein. It is to be understood that the network 100 may be any well known telecommunication network, such as the AT&T network.

In prior art telecommunication networks, the computation of parameters, known as features, for characterizing time varying speech signals was highly sensitive to the introduction of acoustic variations to speech signals by, for example, speech signal enhancement. This condition was particularly noted for the computation of preferred features, such as cepstral features. As a result, the inclusion of such speech signal enhancement in a network connection path severely degraded the performance of automatic speech recognition (ASR) processing where the recognition models utilized for matching feature data representative of the transmitted speech signals were trained on a network path that did not include similar or identical speech signal enhancement circuitry.

In accordance with the present invention, the processor 102 included in the network 100 suitably operates to minimize error levels when speech recognition is performed on transmitted speech signals which may have been enhanced by the speech signal enhancer 107 before further routing to the ASR processing device, such as the processor 102. The processor 102, essentially, performs enhancement compensation operations that afford improved robustness to cepstral feature-based speech recognition processing. Alternatively, the processor 102 in the network 100 may operate in accordance with the present inventive technique to minimize error levels when speech recognition is performed on transmitted speech signals which have not been enhanced before being routed to the processor 102, or have been enhanced by an enhancer which introduces an enhancement to speech signals that differs from the enhancement being compensated for by the processor 102. For purposes of illustration, it is assumed that the recognition models used in performing feature matching during speech recognition processing at the processor 102 have been trained over a network path that does not include speech signal enhancement circuitry.

For purposes of illustration, the enhancer 107 introduces speech signal enhancement to speech signals transmitted from the station S1 to the station S2 during routing through the network to the processor 102. It is assumed that, for the transmitted speech signals routed to the processor 102 which have been enhanced by the enhancer 107, information concerning the nature of the enhancement is available for implementation at the processor 102, in the manner described below, to allow for suitable compensation of the enhancement.

For purposes of clarity and brevity, a knowledge of speech recognition processing techniques which involve the use of linear predictive coding (LPC) and mel-filter analysis for extracting cepstral features from data representative of the spectral characteristics of speech signals is assumed. See Rabiner, Lawrence and Juang, Biing-Hwang, "*Fundamentals of Speech Recognition*" (1993), pp. 103–107, 112–117 and 183–190 incorporated by reference herein. In short, LPC processing involves extracting features from speech signals by source-tract separation and modeling of spectral peaks as a linear combination of past speech samples. Mel-filter analysis involves extracting features from speech signals, based on knowledge of human perceptivity of the acoustic spectral components of speech signals, by advantageously sampling the complete spectrum of speech signals in terms of subjective pitch of pure tones at so-called mel-scale intervals. These mel-scale interval values are conventionally implemented as filter banks, known as mel-filter banks, for suitably modifying spectral components of speech signals to improve overall speech recognition.

In one aspect of the present invention, LPC analysis is combined with mel-filter bank analysis for computing cepstral features that compensate for the introduction of enhancement to transmitted speech signals, where the compensation is implemented when the enhanced speech signals have been suitably transformed to frequency domain representation. As more fully described below, the computation of Mel-LPC cepstrum features includes a mel-filter bank analysis followed by LPC analysis, where autocorrelation coefficients are computed based on a perceptual frequency scale and where smoothing of the power spectrum is performed using LPC techniques. For purposes of illustration, the enhancer 107 includes enhancement circuitry similar to that described in U.S. Pat. No. 5,195,132, cited above (hereinafter TrueVoice$^{SM}$ enhancement), for enhancing speech signals being routed to the processor 102 from the station S1, and speech recognition processing is performed at the processor 102 using recognition models trained using speech signals that have not been enhanced.

Figure 2:
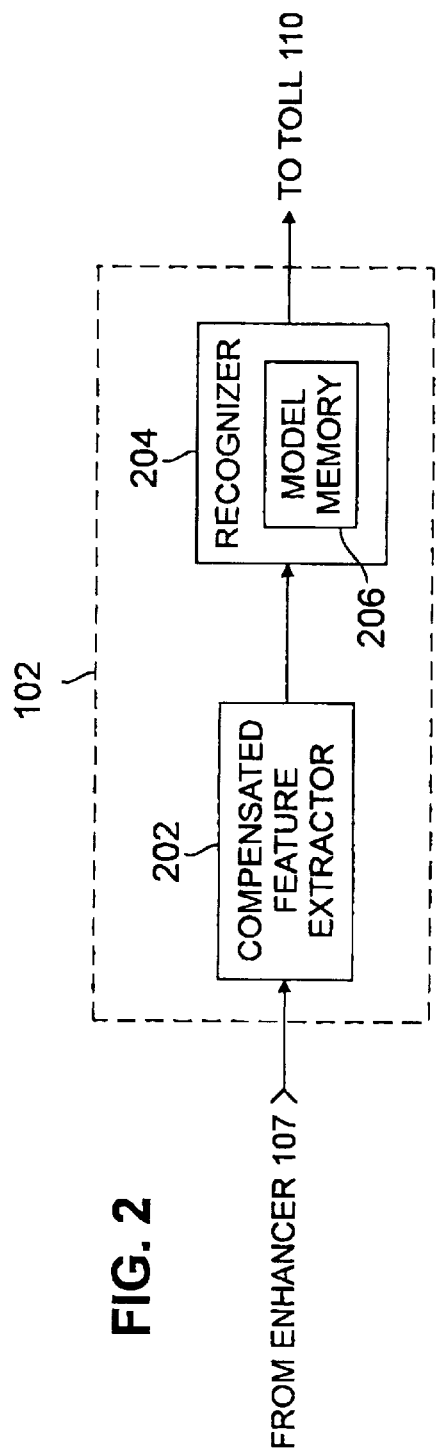
FIG. 2 is an illustrative block diagram of a speech signal processor which may be included in the system of FIG. 1 for performing speech recognition by computing Mel-LPC cepstrum features of enhanced speech signals in accordance with the present invention.

FIG. 2 shows an exemplary embodiment of the processor 102 which may perform arithmetic operations for computing Mel-LPC cepstrum features to provide for highly robust speech recognition for speech signals enhanced by TrueVoice$^{SM}$ enhancement at the enhancer 107. Referring to FIG. 2, the processor 102 suitably includes individual functional blocks for performing mel-cepstral computations and feature matching for transmitted speech signals including or without enhancement. The functions these blocks represent may be provided through the use of either shared or dedicated hardware, including but not limited to hardware capable of executing software. In a preferred embodiment, the functional blocks in the processor 102 comprise a compensated feature extractor 202 and a recognizer 204, which includes a training recognizer model memory 206 as RAM. The extractor 202 and the recognizer 204 are suitably connected to a memory 208. The memory 208 includes programmed instructions which may be suitably performed for implementing the present inventive technique. As explained below, the functional blocks of the extractor 202 and the recognizer 204 provide for the processing of the speech signals transmitted via the toll office 105 or 110 in accordance with implementation of the present inventive technique. It is to be understood that the operations performed by the functional blocks may be similarly performed using a single shared processor. Such a processor may comprise a standard digital signal processor and would include read only memory or other appropriate memory for storing software and performing the operations discussed below. Further, the present invention technique may be implemented using firmware or by discrete components implemented in an integrated circuit. Other suitable embodiments may be readily implemented by those of ordinary skill in the art. For example, while as shown in FIG. 2, the compensated feature extractor 202 is connected to receive its input from enhancer 107, it could be connected directly to a toll such as toll 105 without any intervening enhancement.

Figure 3:
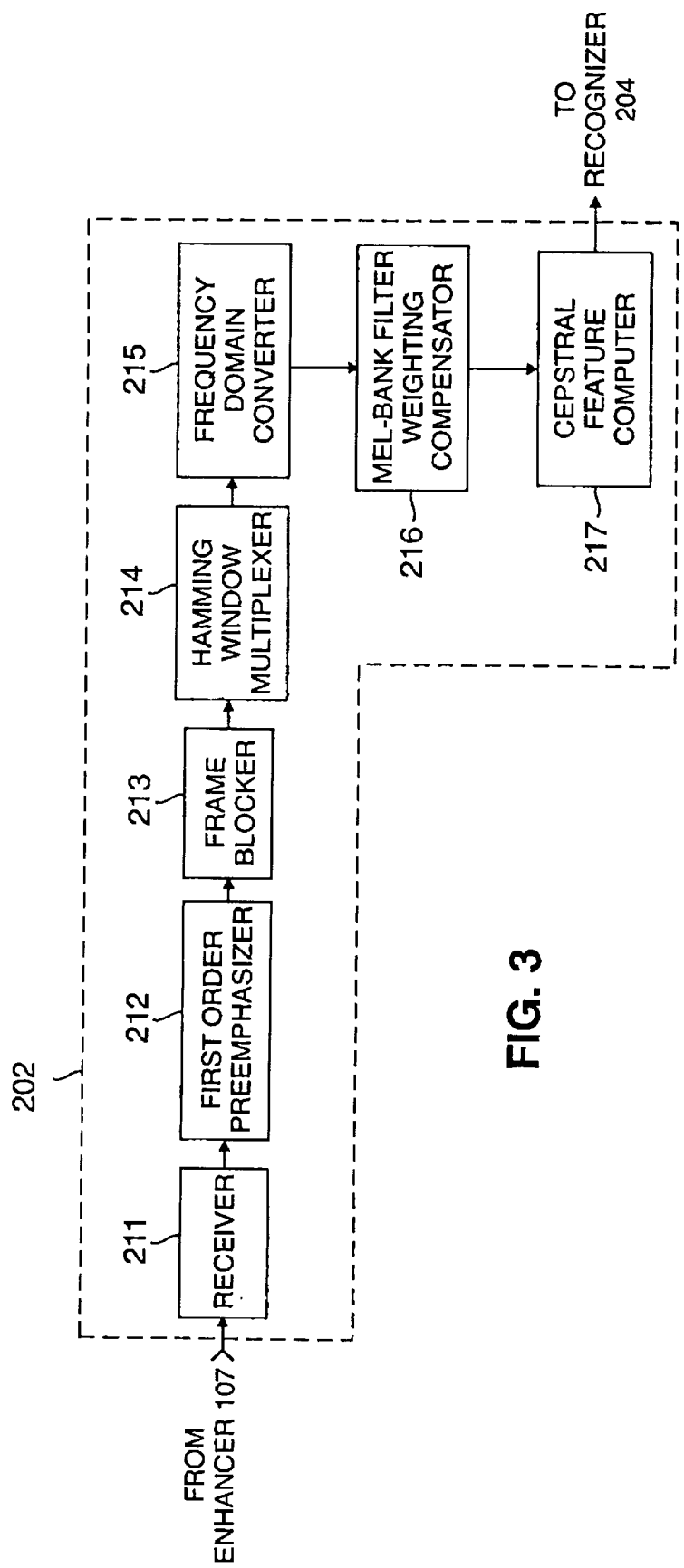
FIG. 3 is an illustrative block diagram of an exemplary compensated feature extractor.

FIG. 3 shows, in detail, an exemplary embodiment of the extractor 202 which may perform the operations for compensating for enhancement to speech signals which are described below in connection with FIG. 4. Referring to FIG. 3, the extractor 202 may suitably comprise a receiver 211, a preemphasizer 212, a frame blocker 213, a Hamming multiplier 214, a frequency domain converter 215, a compensator 216 and a cepstral feature computer 217. These functional blocks suitably perform operations for implementing the present invention technique as more fully discussed below in connection with FIG. 4. It is to be understood that the operations performed at each of these functional blocks may be implemented using a combination of software and/or hardware as well as by software alone.

Referring to FIG. 2, the compensated feature extractor 202 is essentially a front end processor in an ASR system that performs operations for computing Mel-LPC cepstral features of the time varying speech signals routed from the toll office 105 based on spectral or frequency domain representations of the characteristics of these signals. The Mel-LPC cepstral features ultimately computed by the cepstral feature computer 217 of the extractor 202 describe the broad acoustic properties of different phonetic units which are conventionally utilized for speech recognition. In particular, the compensator 216 and the cepstral feature computer 217 combine LPC and mel-filter bank analysis for computing a set of compensated cepstral features representative of transmitted speech signals that provides that ASR processing in the network 100 by the recognizer 204 is substantially insensitive to acoustic variations caused by the enhancement. The Mel-LPC cepstral features are provided to the recognizer 204, which compares them to the recognition models stored in the memory 206 for determining the best word or sequence of words which matches the phonetic unit represented by the computed features. A suitable recognizer may, for example, utilize well known hidden Markov model (HMM) based recognition techniques.

It is noted that some a priori knowledge of the enhancement introduced, such as TrueVoice$^{SM}$ enhancement, is required for performing the compensation of enhancement using frequency domain representative of speech signals in accordance with the present inventive technique. This information may be generally available to the public. Alternatively, information concerning enhancement may be determined, for example, using standard techniques of empirically sampling speech signals transmitted through a network connection path which includes speech signal enhancement circuitry. In comparison, prior art techniques of cepstral mean subtraction and signal bias removal did not require prior knowledge of acoustic variations in speech signals and are considered as blind deconvolution based techniques.

Figure 4:
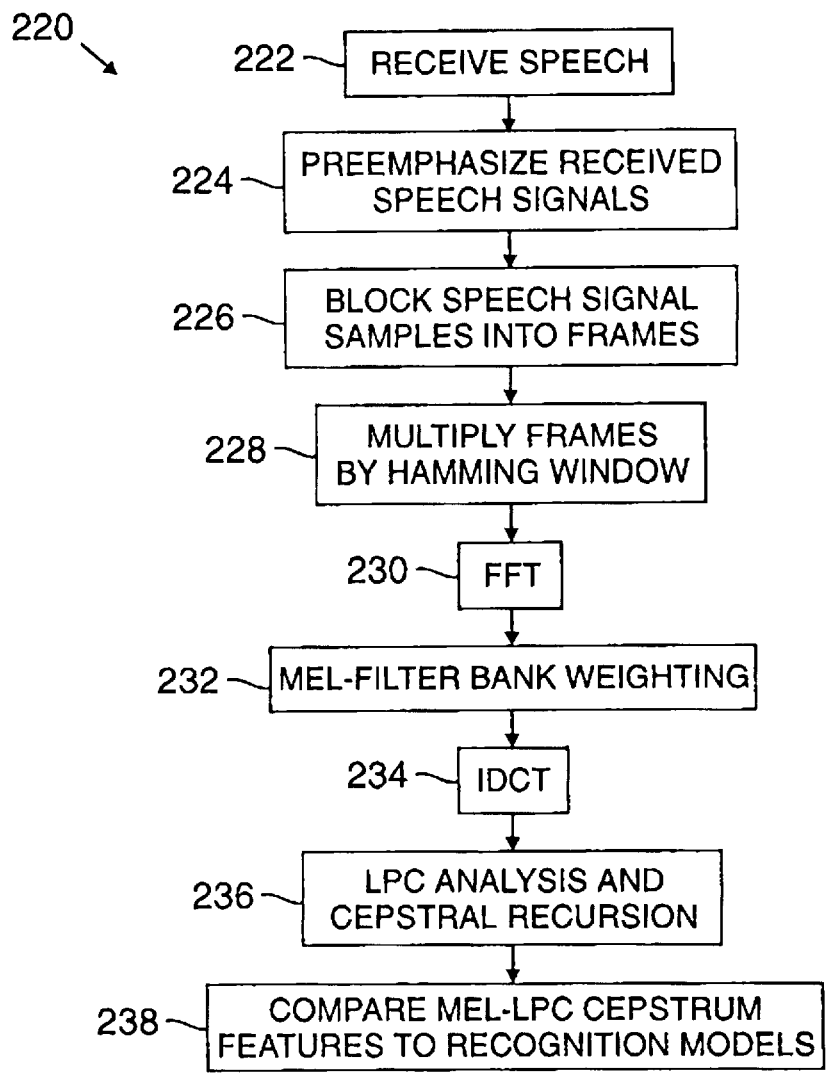
FIG. 4 is a flow diagram of a method for performing speech recognition in accordance with the present inventive technique of computing Mel-LPC cepstrum features of enhanced speech signals.

FIG. 4 shows a method 220 for computing Mel-LPC cepstrum features of enhanced time varying speech signals at the compensated feature extractor 202 of the processor 102 using the exemplary functional blocks shown in FIG. 3. For purposes of illustration, it is assumed that speech signals are digitized, preferably at an 8.0 kHz rate, for emulating a digital telephone network, before being routed to the extractor 202. Referring to FIG. 4, in step 222, the receiver 211 receives the enhanced speech signals from the enhancer 107. Then, in step 224, the preemphasizer 212 processes the digitized speech signal samples to provide for spectral flattening. Preemphasis is suitably performed using, for example, a conventional first order digital network. In step 226, the frame blocker 213 collects or blocks the speech signal samples into frames. A single frame consists of sections of consecutive speech samples which correspond to n msec of signal, and consecutive frames are spaced m msec apart. In step 228, the Hamming multiplier 214 multiplies each frame of samples by a Hamming window as is conventional in the art. In step 230, the frequency domain converter 215 performs a Fourier transformation on each windowed segment of speech for generating a set of spectral samples corresponding to the enhanced speech signals received at the receiver 211.

In step 232, the compensator 216 processes each frame to cause the power spectrum for each frame of spectral samples to pass through a set of M mel-filter banks, may be suitably triangular in shape. The mel-filter banks are suitably weighted to compensate for the effects that enhancement may have on the computation of the cepstral features of the transmitted speech signals. In other words, the effects of enhancement on speech signals are compensated for at the compensator 216, which performs operations on frequency domain representations of the enhanced speech signals. It is noted that the Mel-LPC cepstrum computation provides that the gain of each spectral band may be completely controlled. This allows for compensation of speech signal enhancement simply by imposing a weighting function on the mel-filter banks. For example, compensation for speech signal enhancement may be performed for implementing ideal high pass filtering by de-emphasizing those undesirable mel-filter banks prior to computing cepstral features from the frequency domain representation of the speech signals using LPC techniques. This weighting of data value coefficients in the spectral domain is extremely advantageous and provides for the computation of compensated cepstral features of enhanced speech signals which may be suitably matched to recognition models not trained using enhanced speech signals. It is noted that cepstral features, once computed, cannot be weighted in an analogous manner. It is further noted that such processing of enhanced speech signals may be roughly approximated by filtering of the enhanced speech signals while they are still in their time domain representation.

In the exemplary embodiment of the network 100 where TrueVoice$^{SM}$ enhancement would be introduced to speech signals by the enhancer 107, information concerning the characteristics of the TrueVoice$^{SM}$ enhancement would be utilized for determining the weightings applied to the mel-filter banks of the compensator 216. From experimental analysis, it was found that TrueVoice$^{SM}$ enhancement involved filtering of speech signals using a pre-emphasis filter (p-filter) and applying a slowly varying AVC (Automatic Volume Controller) to the signals, where the p-filter introduced a 10–20 dB spectral pole somewhere in the frequency band between 150 Hz and 220 Hz. In this case, the mel-filter banks would implement the desired high pass filtering in the frequency domain, which would result in modification of the computed cepstrum features and thus improve robustness of speech recognition performance towards low frequency power boosting. For example, mel-filter banks with a frequency below 290 Hz may be assigned zero weight and filter banks having frequencies above 290 Hz may be assigned unitary weight. In other words, the effect of TrueVoice$^{SM}$ enhancement on speech signal recognition would be minimized by de-emphasizing the low frequency mel-spectral bands used in the computation of the Mel-LPC cepstrum. Preferably, a threshold of 290 Hz would be implemented, such that mel bank frequency bands below this threshold would not be considered during the computation of the cepstrum. This Mel-LPC cepstrum processing may be considered as ideal high-pass filtering in which the low frequency bands to 290 Hz are heavily attenuated.

Referring to FIG. 4, in step 234, the cepstral feature computer 217 applies an IDCT (inverse discrete cosine transform) to the smoothed power spectrum to yield Q autocorrelation coefficients, where Q is suitably set to 12. In step 236, the cepstral feature computer 217 converts each set of autocorrelation coefficients first to LPC coefficients using, for example, Durbin's recursion algorithm, and then to cepstral parameters using the standard LPC-to-cepstrum recursion. The dimension of the cepstral vector is suitably set to 12. Finally, in step 238, the recognizer 204 attempts to match the recognition models stored in the model memory 206 to the computed cepstral features for the compensated enhanced speech signals, and provides data representative of the feature matching operations for further routing to the station S2, as is conventional in the art.

It is noted that the Mel-LPC cepstrum feature computation technique may provide for superior robustness towards speech enhancement, and in some cases, not adversely affect ASR performance even when enhancement has not been introduced and the Mel-LPC cepstrum features provide for compensation of a particular enhancement to speech signals. It is to be understood that different filters and cut-off frequencies may be utilized for implementing the present inventive technique of using mel-filter bank processing to compensate for enhancement to speech signals. It is further noted that, for signal enhancement involving fine modifications to the speech spectrum, a robust front-end system, such as one which computes Mel-LPC cepstrum features, provides easy access to the speech recognition system for altering the speech spectrum in any manner required for purposes of computing features of speech signals which are to be matched to recognition models not trained using enhanced speech signals.

It is to be understood that the embodiments and variations shown and described above are illustrative of the principles of this invention only and that various modifications may be implemented by those skilled in the art without departing from the scope and spirit of the invention.

We claim:

1. A method of compensating for enhancement of speech signals for improving speech recognition performance, the method comprising the steps of:
   receiving speech signals enhanced by an audio enhancer, said enhancer introducing frequency gain variations to the speech signals;
   converting said enhanced speech signals to frequency domain representation;
   compensating said gain variations introduced to said speech signals by said enhancer using said frequency domain representation of said enhanced speech signals; and,
   computing cepstral features of the enhanced speech signals after they have been compensated by the compensating step.

2. The method of claim 1, further comprising the step of:
   comparing said features to recognition models stored in a recognizer memory.

3. The method of claim 2 wherein said recognition models have been trained using speech signals not enhanced by said enhancer.

4. The method of claim 1, wherein the step of compensating further comprises the step of computing compensated mel-LPC coefficients, said step of computing compensated mel-LPC coefficients further comprising the steps of:
   preemphasizing the enhanced speech signals for spectral flattening;
   blocking the enhanced speech signals into consecutive frames of speech samples;
   multiplying each of the frames by a Hamming window;
   transforming each of the Hamming window frames from time to frequency domain representations;
   filtering each of the frequency domain representations through a set of weighted mel-filter banks; and,
   generating autocorrelation coefficients from the filtered frequency representations.

5. The method of claim 4, further comprising the steps of:
   converting the autocorrelation coefficients to LPC coefficients; and,
   computing the cepstral parameters from the LPC coefficients.

6. The method of claim 4, wherein the mel-filter banks below a specific frequency are attenuated.

7. The method of claim 6, wherein the specific frequency is approximately 290 Hz.

8. A system for compensating for enhancement of speech signals for improving speech recognition performances the system comprising:
   an enhancer for selectively varying the gain of select frequencies of time varying speech signals transmitted on a network path;
   a receiver for receiving said enhanced speech signals;
   a frequency domain converter for converting the enhanced speech signal received at the receiver to frequency domain representations;
   a compensator for receiving the frequency domain representations of the speech signals enhanced by said enhancer, wherein said compensator introduces gain variations to the frequency domain representations of the speech signals transmitted on the path for compensating for gain variations introduced to the speech signals by said enhancer; and,
   a cepstral feature computer for computing cepstral features from the compensated, frequency domain representations of the enhanced speech signals.

9. The system of claim 8, further comprising:
   a recognizer for receiving said cepstral features from said cepstral feature computer.

10. The system of claim 9 wherein said recognizer compares said features to recognition models trained on the path using speech signals not enhanced by said enhancer, said recognition models being stored in a recognizer memory.

11. The system of claim 8, wherein the compensator passes the frequency domain representations of the enhanced speech signals through a set of weighted mel-filter banks.

12. The system of claim 11, where the cepstral computer generates autocorrelation coefficients from the compensated frequency domain representations.

13. The system of claim 12, wherein the cepstral computer further performs the operations of:
   converting the autocorrelation coefficients to LPC coefficients; and,
   computing said cepstral features from the LPC coefficients.

14. The system of claim 12, wherein the mel-filter banks below a specific frequency are attenuated.

15. The system of claim 14, wherein the specific frequency is approximately 290 Hz.

16. A method of computing compensated cepstral features of speech signals enhanced by a first enhancer using a computing system, for improving speech recognition performance, said computing system comprising a memory and at least one processor, said memory including mel-filter bank weighting values, the method comprising the steps of:

receiving the enhanced speech signals at the processor;

preemphasizing the enhanced speech signals for spectral flattening;

blocking the enhanced speech signals into consecutive frames of speech samples;

multiplying each of the frames by a Hamming window;

transforming each of the Hamming window frames from time to frequency domain representations;

filtering each of the frequency domain representations using the mel-filter bank weighting values stored in the memory;

generating autocorrelation coefficients from the filtered frequency representations;

converting the autocorrelation coefficients to LPC coefficients; and, computing the cepstral parameters from the LPC coefficients.

17. The method of claim 16, further comprising the step of:

comparing said features to recognition models stored in a recognizer memory.

18. The method of claim 17 wherein said recognition models have been trained using speech signals not having been enhanced.

19. The method of claim 16, wherein the values of the mel-filter banks below a specific frequency are attenuated.

20. The method of claim 19, wherein the specific frequency is approximately 290 Hz.

21. The method of claim 16 further comprising the step of:

modifying the mel-filter bank weighting values stored in the memory for compensating for enhancement to the speech signals by a second enhancer, said second enhancer providing enhancement differing from said enhancement provided by said first enhancer.

22. A method of computing compensated cepstral features of speech signals using a computing system, said computing system comprising a memory and at least one processor, said memory including mel-filter bank weighting values providing compensation for the computation of cepstral features for speech signal enhancement by an enhancer, the method comprising the steps of:

receiving the speech signals at the processor;

preemphasizing the speech signals for spectral flattening;

blocking the speech signals into consecutive frames of speech samples;

multiplying each of the frames by a Hamming window;

transforming each of the Hamming window frames from time to frequency domain representations;

filtering each of the frequency domain representations using the mel-filter bank weighting values stored in the memory;

generating autocorrelation coefficients from the filtered frequency representations;

converting the autocorrelation coefficients to LPC coefficients; and, computing the cepstral parameters from the LPC coefficients.

23. The method of claim 22, further comprising the step of:

comparing said features to recognition models stored in a recognizer memory.

24. The method of claim 23 wherein said recognition models have been trained using speech signals not having been enhanced.

25. A feature extractor apparatus for generating speech feature signals characterizing enhanced speech signals comprising:

a frequency domain converter for generating a set of spectral samples representing the speech signals;

a weighting unit for selectively weighting the set of spectral samples said weightings being determined by characteristics of said enhanced speech; and, a feature computer for generating speech characterizing feature signals based on the weighted set of spectral samples.

26. The apparatus of claim 25, further comprising a receiver, wherein the receiver is connected to the frequency domain converter through a preprocessing circuit.

27. The apparatus of claim 26, wherein the preprocessing circuit comprises a preemphasizer circuit.

28. The apparatus of claim 26, wherein the preprocessing circuit comprises a frame blocker.

29. The apparatus of claim 26, wherein the preprocessing circuit comprises a Hamming multiplier.

30. The apparatus of claim 25, wherein the weighting unit comprises a set of M selectively weighted mel-filter banks.

31. A method for generating speech feature signals characterizing enhanced speech signals, the method comprising the steps of:

generating a set of spectral parameters characterizing speech signals;

weighting the set of spectral parameters said weightings being determined by characteristics of said enhanced speech signals; and generating speech characterizing feature signals based on the weighted set of spectral samples.

32. A system for recognizing speech signals and for compensating for network enhancement of said signals comprising:

a filter for compensating for a network enhancement component of enhanced speech signals;

a feature extractor for extracting features based on filtered speech signals from said filter; and a speech recognizer for recognizing speech signals based on extracted features from the feature extractor.

33. The system of claim 32, wherein the filter comprises a set of selectively weighted mel-filter banks.

34. The system of claim 32, wherein the feature extractor comprises a combination of a linear predictive coding analyzer and a mel-filter analyzer.

35. A method of generating feature signals from speech signals having a network enhancement comprising the following steps:

receiving the speech signals;

blocking the speech signals into frames;

forming frequency domain representations of said blocked speech signals;

passing said frequency domain representations through mel-filter banks to compensate for the network enhancement; and performing in combination linear predictive coding and cepstral recursion analysis on the blocked speech signals to produce mel-LPC cepstrum feature signals.

36. The method of claim 35 further comprising the step of comparing the mel-LPC cepstrum features to a recognition model.

37. The method of claim 35 further comprising the step of:

utilizing a mel-filter bank to filter the blocked speech signals and produce mel-filtered signals which are then analyzed by performing linear predictive coding and cepstral recursion analysis in combination.

38. The method of claim 35 further comprising the step of preemphasizing the speech signals to achieve spectral flattening of said signals.

39. The method of claim 38 further comprising the step of multiplying each of the frames by a Hamming window.

40. The method of claim 39 further comprising the step of transforming each of the Hamming window frames from a time representation to a frequency domain representation.

41. The method of claim 40 further comprising filtering each of the frequency domain representations using mel-filter bank weighting values stored in a memory.

42. The method of claim 41 further comprising the step generating autocorrelation coefficients from the filtered frequency representations.

43. The method of claim 42, wherein the linear predictive coding analysis operates to convert the autocorrelation coefficients to LPC coefficients and the cepstral recursion analysis operates to compute cepstral parameters from the LPC coefficients.

44. A method of compensating for enhancement of speech signals to improve speech recognition performance, the method comprising the steps of:
receiving speech signals enhanced by an audio enhancer, said enhancer introducing frequency gain variations to the speech signals;
converting said enhanced speech signals to a frequency domain representation;
compensating said gain variations introduced to said speech signals by said enhancer using said frequency domain representation of said enhanced speech signals; and
generating feature signals characterizing the enhanced speech signals after they have been compensated by the compensating step.

45. The method of claim 44 further comprising the step of:
comparing said features to recognition models stored in a recognizer memory.

46. The method of claim 45, wherein said recognition models have been trained using enhanced speech signals.

* * * * *